Oct. 9, 1928.

G. H. CHASE ET AL 1,686,797

SPECTACLE TEMPLE

Filed May 17, 1926

Inventor
George H. Chase
Oscar H. Flodin
By David Rines
Attorney

Patented Oct. 9, 1928.

1,686,797

UNITED STATES PATENT OFFICE.

GEORGE H. CHASE AND OSCAR H. FLODIN, OF ROCHESTER, NEW YORK, ASSIGNORS TO BAUSCH AND LOMB OPTICAL COMPANY, OF NEW YORK, N. Y., A CORPORATION OF NEW YORK.

SPECTACLE TEMPLE.

Application filed May 17, 1926. Serial No. 109,583.

The present invention relates to spectacle temples, and more particularly to temples of the cable type. From a more limited aspect, the invention relates to cable temples comprising non-metal material reinforced by metal cores.

A well known cable temple of the above-described character is provided with a forward non-metal member the rear end of which is provided with a bore, and a metal cable ear hook the forward end of which is secured in the bore. A non-metal cable is mounted over the rearward projecting portion of the metal cable. One of the defects of this temple is the weak joint between the non-metal forward portion and the metal and the non-metal cables that extend rearward therefrom.

One of the objects of the present invention, therefore, is to strenghten the joint between the non-metal forward portion and the metal cable, and between the non-metal forward portion and the non-metal cable.

To these ends, a feature of the invention contemplates the provision of a countersink on one of the non-metal members and a portion upon the other non-metal member projecting into the countersink, the parts being secured together in assembled relation.

With these and other objects in view, the invention consists of the improved spectacle temple a preferred embodiment of which is hereinafter described, illustrated in the accompanying drawings and defined in the appended claims.

Figure 1:
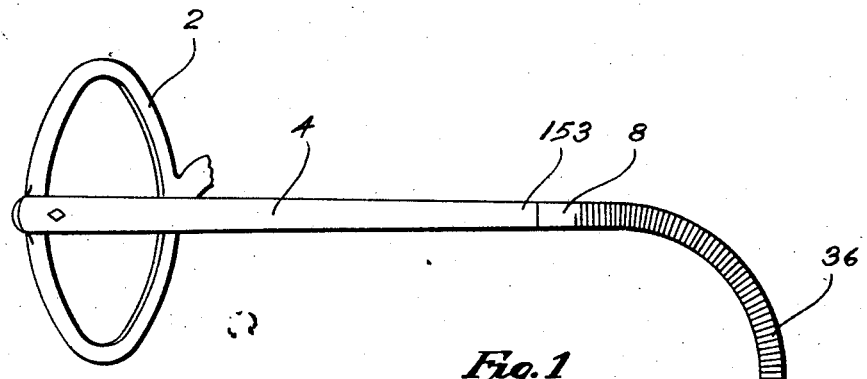
Figure 2:
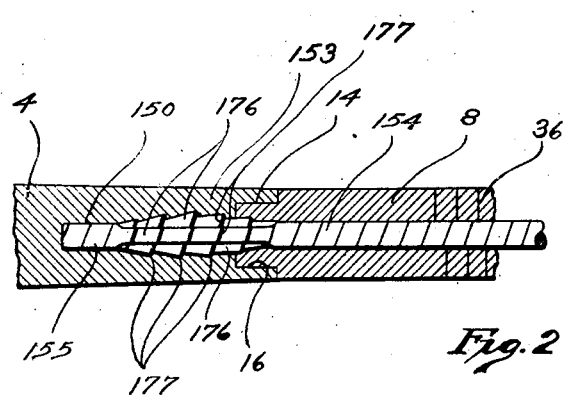
Figure 3:
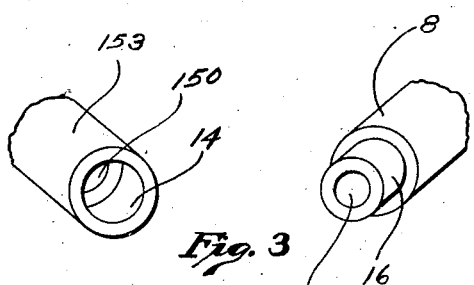
Figure 4:
Figure 5:
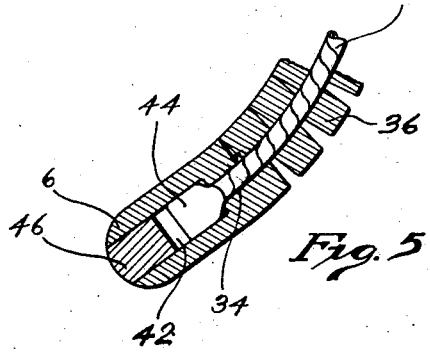

In the accompanying drawings, Fig. 1 is an elevation of a cable temple constructed according to a preferred embodiment of the present invention, shown hinged to a fragment of a lens-holding frame; Fig. 2 is an enlarged longitudinal section of the same; Figs. 3 and 4 are fragmentary perspective views of the rear end of the forward non-metal portion and the forward end of the non-metal cable, respectively; and Fig. 5 is a fragmentary longitudinal section of the rear end of the temple.

The improved cable temple of the present invention is illustrated as comprising a forward portion 4 of plastic, non-metal material, like celluloid, zylonite or other composition. Its outer surface usually tapers from its forward end towards its rear end and its sides are milled. It is shown pivotally connected at its forward end to a lens-holding frame 2 by a hinge (not shown). The rear end 153 of the forward portion 4 is longitudinally bored at 150. The longitudinal bore 150 is of approximately uniform dimension to start with.

The forward end 155 of a flexible, helically wound, reinforcing metal cable rod 154 is struck up or swaged to provide one or more fins 176. Four fins are illustrated. The finned end 155 of the cable rod 154 is then forced by pressure into the bore 150. The fins 176 bite into the walls of the bore 150 and the rod 154 becomes thus locked in place. Owing to the helical nature of the cable of the metal rod 154, the fins 176 become provided with corrugations or projections 177 that bite into the walls of the bore 150 and help to lock the forward end of the rod 154 in position within the bore 150. A very secure locking effect is thus obtained, the metal core projecting rearward beyond the rear end of the forward member 4. This feature of the invention is not claimed herein as it forms the subject matter of a copending application Serial No. 50,543, filed August 17, 1925.

An intermediate portion of a non-metal tube 36 is cut into helical or cable form to render it very yielding. As non-metal material of the above-described character is very resilient and flexible, the non-metal tube thus cut is maintained in its helical form by its own resiliency. The rear and the forward ends of the helically cut tube 36 are left uncut to provide sleeves 6 and 8. The rear end of the portion 4 is countersunk at 14 and the forward end of the portion 36 is milled at 16, the milled portion being cemented in the countersunk portion to secure the non-metal parts together. The rear end or tip 6 of the helically cut tube is provided with a recess 42 of larger diameter than the bore 34 of the tube.

The metal cable core 154 is mounted in the bore 34 of the tube 36 and the rear end of the core 154 may be secured in the uncut sleeve 6 in any desired manner, preferably by providing the rod 154 with a flattened terminal enlargement 44 that is seated in the recess 42. The flattening may be effected as described in a copending application, Serial No. 96,180 filed March 20, 1926, or in any other desired manner. Owing to the resilient nature of the non-metal material, the parts of the helical element 36 can be very snugly pulled together by this construction. A plug 46 is mounted in the recess 42 to conceal the enlargement 44.

It will be understood that the invention is not restricted to the exact embodiment thereof that is illustrated and described herein, but is capable of modification in other respects also by persons skilled in the art. All such modifications are considered to fall within the spirit and scope of the invention, as defined in the appended claims.

What is claimed is:

1. A spectacle temple comprising a member adapted to be hinged at the forward end, a reinforcing member projecting rearward beyond the rear end of the first-named member, and a non-metal helically cut tube member mounted on the projecting portion of the reinforcing member, one of the first-named and third-named members having a countersink and the other having a portion secured in the countersink.

2. A spectacle temple comprising a member adapted to be hinged at the forward end, a flexible reinforcing member projecting rearward beyond the rear end of the first-named member, and a flexible non-metal helically cut tube member mounted over the projecting portion of the reinforcing member, one of the first-named and the third-named members having a countersink and the other having a milled portion cemented in the countersink.

3. A spectacle temple comprising a non-metal member countersunk at its rear end and adapted to be hinged at the forward end, a flexible reinforcing member projecting rearward beyond the rear end of the non-metal member, and a flexible non-metal helically-cut tube member mounted over the projecting portion of the reinforcing member, the forward portion of the tube member not being helically cut but being reduced in cross section, the reduced portion being cemented in the countersink.

4. A spectacle temple comprising a non-metal member adapted to be hinged at the forward end and having a rear end portion, a reinforcing member projecting rearward beyond the rear end portion, and a non-metal helically-cut tube mounted over the projecting portion of the reinforcing member and having a non-helical forward end portion, one of the said end portions being countersunk and the other being secured in the countersink.

5. A spectacle temple comprising a non-metal member adapted to be hinged at the forward end and having a countersunk rear end portion, a reinforcing member projecting rearward beyond the rear end portion, and a non-metal tube cut into helical form in the bore of which the projecting portion of the reinforcing member is mounted, the forward end of the tube not being helically cut, whereby a sleeve is provided at the forward end of the tube, the sleeve being secured in the countersunk rear end portion.

In testimony whereof, we have hereunto subscribed our names.

GEORGE H. CHASE.
OSCAR H. FLODIN.